United States Patent
Cho et al.

(10) Patent No.: US 10,212,210 B2
(45) Date of Patent: Feb. 19, 2019

(54) ELECTRONIC DEVICE AND METHOD OF PROVIDING INFORMATION ABOUT THE ACCESS POINT (AP)

(71) Applicant: SAMSUNG ELECTRONICS CO., LTD., Suwon-si, Gyeonggi-do (KR)

(72) Inventors: Kiho Cho, Yongin-si (KR); Wontae Chae, Suwon-si (KR); Sinjae Kang, Yongin-si (KR); Hyuk Kang, Yongin-si (KR); Inji Jin, Bucheon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 35 days.

(21) Appl. No.: 15/358,299

(22) Filed: Nov. 22, 2016

(65) Prior Publication Data

US 2017/0164414 A1 Jun. 8, 2017

(30) Foreign Application Priority Data

Dec. 4, 2015 (KR) .................. 10-2015-0172740

(51) Int. Cl.
| | |
|---|---|
| *H04L 29/08* | (2006.01) |
| *H04L 29/12* | (2006.01) |
| *H04L 29/06* | (2006.01) |
| *H04W 76/10* | (2018.01) |

(52) U.S. Cl.
CPC .......... *H04L 67/02* (2013.01); *H04L 61/2015* (2013.01); *H04L 67/34* (2013.01); *H04L 67/36* (2013.01); *H04L 69/16* (2013.01); *H04W 76/10* (2018.02)

(58) Field of Classification Search
CPC ......... H04L 67/02; H04L 67/34; H04L 67/36; H04L 69/16; H04L 61/2015; H04W 76/10
See application file for complete search history.

(56) References Cited

U.S. PATENT DOCUMENTS

| | | | |
|---|---|---|---|
| 7,783,284 B1 * | 8/2010 | Laux .................. | H04L 41/12 455/411 |
| 9,485,669 B2 * | 11/2016 | Kosugi ............... | H04W 24/00 |
| 2009/0285192 A1 * | 11/2009 | Shiba .................. | H04W 80/02 370/338 |
| 2012/0057578 A1 | 3/2012 | Park | |
| 2014/0241271 A1 * | 8/2014 | Jung ................... | H04W 8/26 370/329 |

(Continued)

FOREIGN PATENT DOCUMENTS

JP 2015-061100 3/2015

*Primary Examiner* — Christine Ng
(74) *Attorney, Agent, or Firm* — Nixon & Vanderhye P.C.

(57) ABSTRACT

According to various embodiments, an electronic device and a method of providing information about an access point (AP) may include: confirming one or more access points (APs) outside an electronic device; starting a connection to the selected AP of the one or more APs through a communication circuit; acquiring AP information corresponding to the selected AP from the selected AP during the connection to the selected AP; determining characteristics of the selected AP based on at least the AP information; and displaying a first notification in association with the selected AP based on the characteristics including a first group and a second notification in association with the selected AP based on the characteristics including a second group through the display.

17 Claims, 12 Drawing Sheets

(56) References Cited

U.S. PATENT DOCUMENTS

| | | | |
|---|---|---|---|
| 2014/0254500 A1* | 9/2014 | Alavudin | H04W 72/044 370/329 |
| 2014/0298054 A1* | 10/2014 | Hasui | G06F 1/3243 713/320 |
| 2016/0183174 A1* | 6/2016 | Xie | H04W 48/18 455/436 |
| 2017/0006614 A1* | 1/2017 | Reddy | H04W 72/046 |

* cited by examiner

FIG. 8A
FIG. 8B
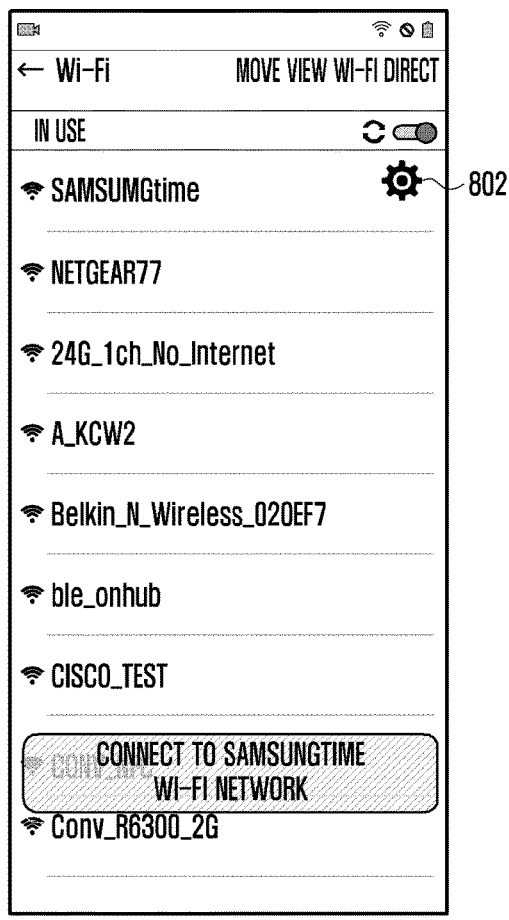
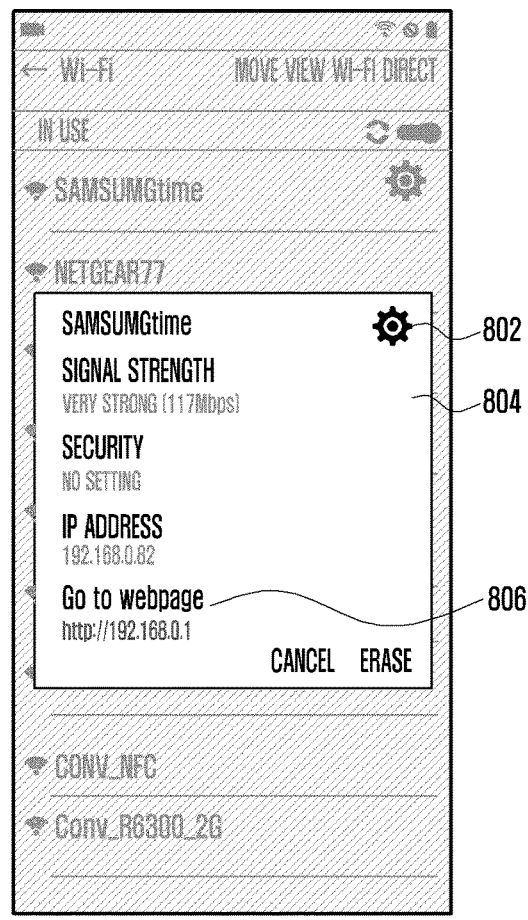

FIG. 12 http://192.168.0.1/login/login.cgi

MULTI WIRELESS NETWORK

| NETWORK NAME(SSID) | |
|---|---|
| SET COMMUNICATION POLICY | ● PERMIT ALL COMMUNICATIONS <br> ○ PERMIT ONLY INTERNET COMMUNICATION <br> ○ PERMIT ONLY INTERNAL NETWORK COMMUNICATION |
| NOTIFY SSID (NETWORK NAME) | ● USE <br> ○ NO USE |
| WMM FUNCTION | ● USE <br> ○ NO USE |
| AUTHENTICATION METHOD | AUTO ▼ |
| ENCRYPTION METHOD | ● NO USE    ○ WEP64 <br> ○ WEP128   ○ AES |
| Qos | DOWNLOAD MAXIMUM SPEED [ ] Kbps <br> UPLOAD MAXIMUM SPEED [ ] Kbps |

ADD UP TO TWO WIRELESS NETWORK        [ADD]

TEMPORARILY DISCONNECT WIRELESS NETWORK UPON SETTING        [CANCEL]

| WIRELESS NETWORK INFORMATION | OPERATION | DELETE |
|---|---|---|
| ((ɸ)) myhome | | IN OPERATION |

ELECTRONIC DEVICE AND METHOD OF PROVIDING INFORMATION ABOUT THE ACCESS POINT (AP)

CROSS-REFERENCE TO RELATED APPLICATION

This application is based on and claims priority under 35 U.S.C. § 119 to a Korean patent application filed on Dec. 4, 2015, in the Korean Intellectual Property Office and assigned Serial No. 10-2015-0172740, the disclosure of which is hereby incorporated by reference herein in its entirety.

TECHNICAL FIELD

The present disclosure relates generally to an electronic device and a method of providing information about an access point (AP).

BACKGROUND

Recently, with the advent of a smart phone, the use range of wireless communication service has been gradually expanded to video communication, provision of various multimedia through the Internet connection, etc., besides voice communication. Accordingly, a demand for various applications besides ultrahigh speed data transmission has greatly increased and the number of user accessing WiFi networks (WiFi network or wireless local area network (WLAN)), which provides an ultrahigh speed wireless access and is more cost-effective and simpler, to use the Internet has rapidly increased. The WiFi network is a local area network that uses repeaters, that is, access points (AP) to access the Internet within a predetermined range where the APs are installed.

Recently, as the WiFi network is widely used for various electronic devices including a smart phone, the case in which a number of users within a limited area simultaneously accesses one AP has increased. Since the APs does not have security cryptogram at an early stage of production, a security issue of the electronic devices connected to the APs may arise For security setting of the AP, a user needs to access a web page that may set the security of the AP. For this purpose, the user needs to directly confirm a default gateway address value of the corresponding AP and input the confirmed default gateway address value to an address window of browser.

SUMMARY

Accordingly, example embodiments of the present disclosure are directed to provision of an electronic device and a method of providing information about an access point (AP) capable of improving user convenience by easily accessing a screen for security setting of the AP and preventing a security issue by easily changing the security setting of the AP.

Various example embodiments of the present disclosure are directed to the provision of an electronic device, the electronic device comprising: a communication circuit, a display, and a processor electrically connected between the communication circuit and the display, in which the processor is configured to confirm one or more access points (APs) outside the electronic device, to start a connection to the selected AP of the one or more APs through the communication circuit, to acquire AP information corresponding to the selected AP from the selected AP during the connection to the selected AP, to determine characteristics of the selected AP based on at least the AP information, and to display a first notification in association with the selected AP based on characteristics included in a first group and a second notification in association with the selected AP based on characteristics included in a second group through the display.

Various example embodiments of the present disclosure are directed to the provision of a method of providing, by an electronic device, information about an access point (AP), the method comprising: an operation of confirming one or more access points (APs) outside an electronic device, an operation of starting a connection to the selected AP of the one or more APs through a communication circuit, an operation of acquiring AP information corresponding to the selected AP from the selected AP during the connection to the selected AP, an operation of determining characteristics of the selected AP based on at least the AP information, and an operation of displaying a first notification in association with the selected AP based on characteristics included in a first group and a second notification in association with the selected AP based on characteristics included in a second group through the display.

According to various example embodiments of the present disclosure, it is possible to improve the user convenience by easily accessing the screen for security setting of the AP and prevent and/or reduce the security issue by easily changing the security setting of the AP.

BRIEF DESCRIPTION OF THE DRAWINGS

The above and other aspects, advantages and attendant features of the disclosure will become more readily apparent from the following detailed description, taken in conjunction with the accompanying drawings, in which like reference numerals refer to like elements, and wherein:

FIGS. 8A and 8B are diagrams illustrating an example of providing, by the electronic device, notification associated with AP setting information according to various example embodiments of the present disclosure;

FIG. 12 is a diagram illustrating an example of providing, by the electronic device, a detailed setting screen for setting the specific AP according to various example embodiments of the present disclosure.

DETAILED DESCRIPTION

Figure 1:
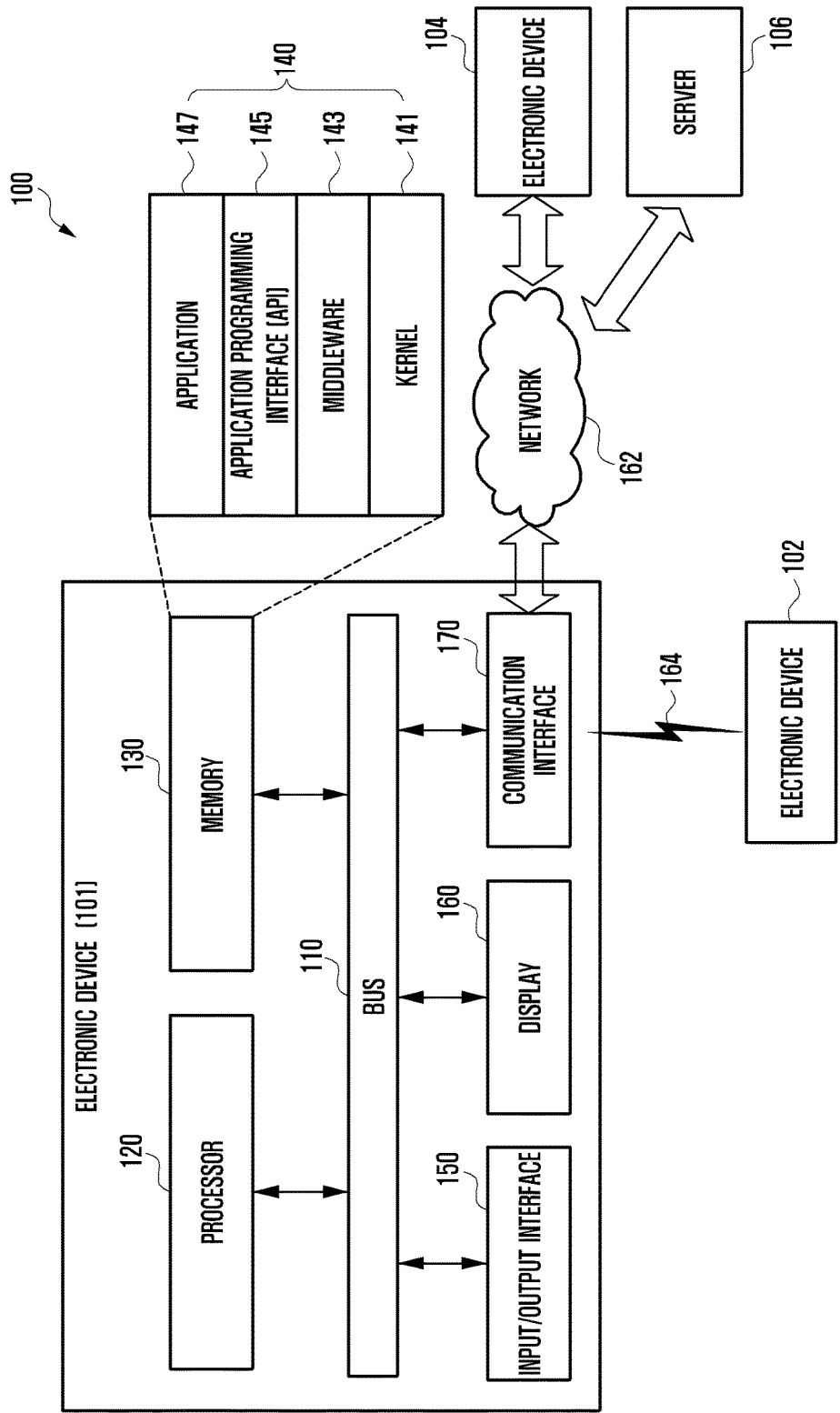
FIG. 1 is a block diagram illustrating an example electronic device within network environment according to various example embodiments of the present disclosure.

The following description with reference to the accompanying drawings is provided to aid in a comprehensive understanding of various example embodiments of the present disclosure as defined by the claims and their equivalents. It includes various details to aid in that understanding but these are to be regarded as merely examples. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" may denote the presence of the disclosed functions, operations, and constituent elements and do not limit one or more additional functions, operations, and constituent elements. Terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), adigital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a TeleVision (TV), a Digital Video Disk (DVD) player, an audio device, various medical devices (for example, Magnetic Resonance Angiography (MRA), Magnetic Resonance Imaging (MRI), Computed Tomography (CT), a scanning machine, a ultrasonic wave device, or the like), a navigation device, a Global Positioning System (GPS) receiver, an Event Data Recorder (EDR), a Flight Data Recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a Head-Mounted Display (HMD), a flat panel display device, an electronic frame, an electronic album, furniture or a portion of a building/structure that includes a communication function, an electronic board, an electronic signature receiving device, a projector, and the like. It will be apparent to those skilled in the art that the electronic device according to the present disclosure is not limited to the aforementioned devices.

FIG. 1 is a block diagram illustrating an example configuration of an electronic device according to an example embodiment of the present disclosure.

Referring to FIG. 1, the electronic device 101 is illustrated in a network environment 100, and may include a bus 110, a processor 120, a memory 130, an input/output interface (e.g., including input/output circuitry) 150, a display 160, a communication interface (e.g., including communication circuitry) 160, and other similar and/or suitable components.

The bus 110 may be a circuit which interconnects the above-described elements and delivers a communication (e.g., a control message) between the above-described elements.

The processor 120 may receive commands from the above-described other elements (e.g., the memory 130, the input/output interface 150, the display 160, the communication interface 170, etc.) through the bus 110, may interpret the received commands, and may execute calculation or data processing according to the interpreted commands.

The memory 130 may store commands or data received from the processor 120 or other elements (e.g., the input/output interface 150, the display 160, the communication interface 170, etc.) or generated by the processor 120 or the other elements. The memory 130 may include programming modules, such as a kernel 141, middleware 143, an Application Programming Interface (API) 145, an application 147, and the like. Each of the above-described programming modules may be implemented in software, firmware, hardware, or a combination of two or more thereof.

The kernel 141 may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 145, for example, may perform load balancing of the work requests using a method of assigning a priority, in which system resources (e.g., the bus 110, the processor 120, the memory 130, etc.) of the electronic device 101 can be used, to at least one of the one or more applications 147.

The API 145 is an interface through which the application 147 is capable of controlling a function provided by the kernel 141 or the middleware 143, and may include, for example, at least one interface or function for file control, window control, image processing, character control, or the like.

The input/output interface 150 may include various input/output circuitry configured to, for example, receive a command or data as input from a user, and may deliver the received command or data to the processor 120 or the memory 130 through the bus 110. The display 160 may display a video, an image, data, or the like to the user.

The communication interface 170 may include various communication circuitry configured to connect communication between another electronic device 102 and the electronic device 101. The communication interface 170 may support a predetermined short-range communication protocol (e.g., Wi-Fi, BlueTooth (BT), and Near Field Communication (NFC)), or predetermined network communication 162 (e.g., the Internet, a Local Area Network (LAN), a Wide Area Network (WAN), a telecommunication network, a cellular network, a satellite network, a Plain Old Telephone Service (POTS), or the like). Each of the electronic devices 102 and 104 may be a device which is identical (e.g., of an identical type) to or different (e.g., of a different type) from the electronic device 101. Further, the communication module 160 may connect communication between a server 164 and the electronic device 100 via the network 162.

Figure 2:
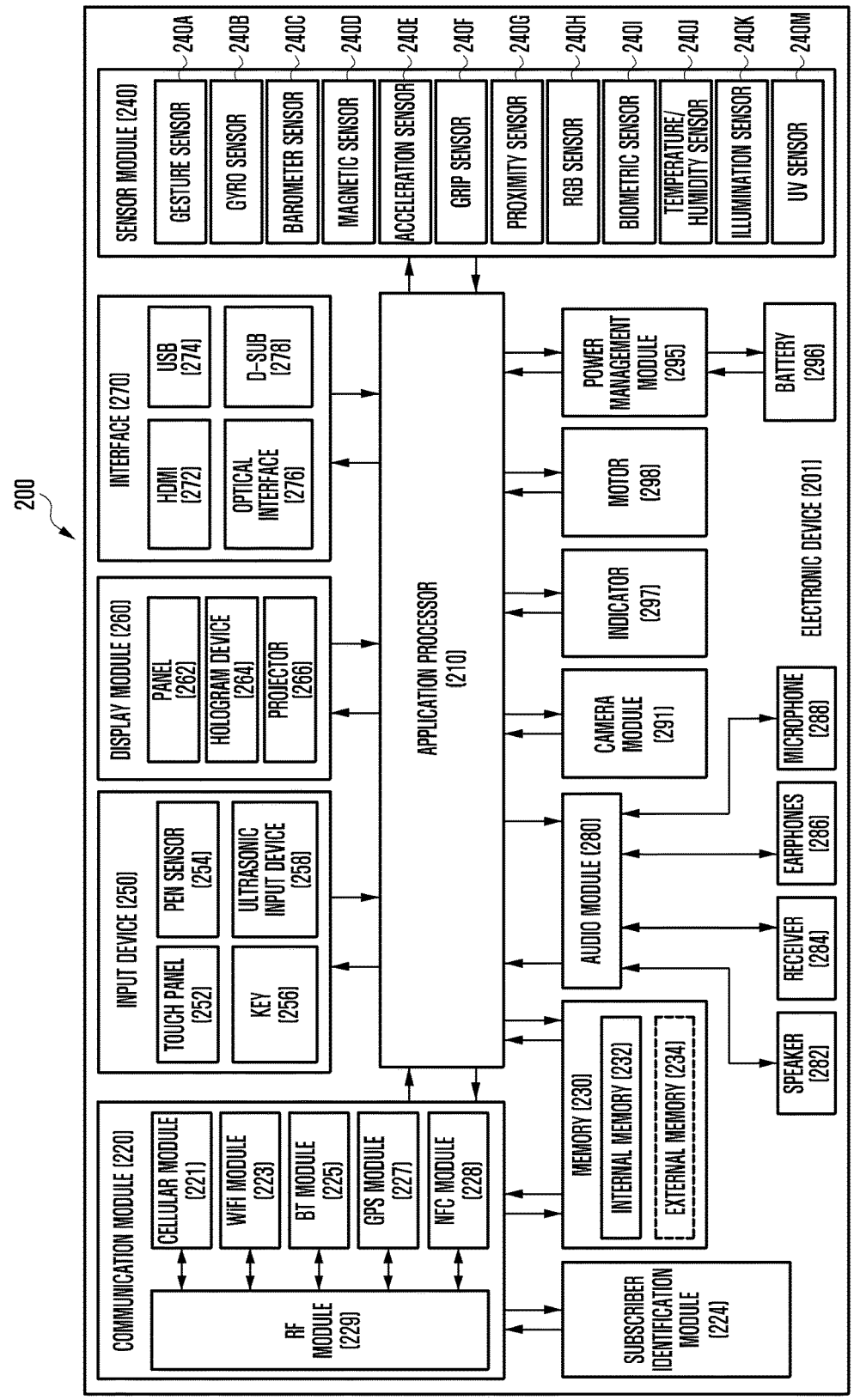
FIG. 2 is a block diagram illustrating an example electronic device according to various example embodiments of the present disclosure.

FIG. 2 is a block diagram 200 illustrating an example configuration of an electronic device 201 according to an example embodiment of the present disclosure.

The hardware 200 may be, for example, the electronic device 101 illustrated in FIG. 1.

Referring to FIG. 2, the electronic device may include one or more processors 210, a communication module (e.g., including communication circuitry) 220, a Subscriber Identification Module (SIM) card 224, a memory 230, a sensor module 240, a input device (e.g., including input circuitry) 250, a display module 260, an interface (e.g., including interface circuitry) 270, an audio module 280, a camera module 291, a power management module 295, a battery 296, an indicator 297, a motor 298 and any other similar and/or suitable components.

The Application Processor (AP) 210 (e.g., the processor 120) may include one or more Application Processors (APs), or one or more Communication Processors (CPs). The processor 210 may be, for example, the processor 120 illustrated in FIG. 1. The AP 210 is illustrated as being included in the processor 210 in FIG. 2, but may be included in different Integrated Circuit (IC) packages, respectively. According to an embodiment of the present disclosure, the AP 210 may be included in one IC package.

The AP 210 may execute an Operating System (OS) or an application program, and thereby may control multiple hardware or software elements connected to the AP 210 and may perform processing of and arithmetic operations on various data including multimedia data. The AP 210 may be implemented by, for example, a System on Chip (SoC). According to an embodiment of the present disclosure, the AP 210 may further include a Graphical Processing Unit (GPU) (not illustrated).

The AP 210 may manage a data line and may convert a communication protocol in the case of communication between the electronic device (e.g., the electronic device 100) including the hardware 200 and different electronic devices connected to the electronic device through the network. The AP 210 may be implemented by, for example, a SoC. According to an embodiment of the present disclosure, the AP 210 may perform at least some of multimedia control functions. The AP 210, for example, may distinguish and authenticate a terminal in a communication network by using a subscriber identification module (e.g., the SIM card 224). Also, the AP 210 may provide the user with services, such as a voice telephony call, a video telephony call, a text message, packet data, and the like.

Further, the AP 210 may control the transmission and reception of data by the communication module 220. In FIG. 2, the elements such as the AP 220, the power management module 295, the memory 230, and the like are illustrated as elements separate from the AP 210. However, according to an embodiment of the present disclosure, the AP 210 may include at least some (e.g., the CP) of the above-described elements.

According to an embodiment of the present disclosure, the AP 210 may load, to a volatile memory, a command or data received from at least one of a non-volatile memory and other elements connected to each of the AP 210, and may process the loaded command or data. Also, the AP 210 may store, in a non-volatile memory, data received from or generated by at least one of the other elements.

The SIM card 224 may be a card implementing a subscriber identification module, and may be inserted into a slot formed in a particular portion of the electronic device 100.

The SIM card 224 may include unique identification information (e.g., Integrated Circuit Card IDentifier (ICCID)) or subscriber information (e.g., International Mobile Subscriber Identity (IMSI)).

The memory 230 may include an internal memory 232 and an external memory 234. The memory 230 may be, for example, the memory 130 illustrated in FIG. 1. The internal memory 232 may include, for example, at least one of a volatile memory (e.g., a Dynamic RAM (DRAM), a Static RAM (SRAM), a Synchronous Dynamic RAM (SDRAM), etc.), and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a Not AND (NAND) flash memory, a Not OR (NOR) flash memory, etc.). According to an embodiment of the present disclosure, the internal memory 232 may be in the form of a Solid State Drive (SSD). The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a memory stick, or the like.

The communication module 220 may include various communication circuitry, such as, for example, and without limitation, a cellular module 221, a wireless communication module 223 or a Radio Frequency (RF) module 229. The communication module 220 may be, for example, the communication interface 170 illustrated in FIG. 1. The communication module 220 may include various communication circuitry, such as, for example and without limitation, a Wi-Fi part 223, a BT part 225, a GPS part 227, or a NFC part 228. For example, the wireless communication module 220 may provide a wireless communication function by using a radio frequency. Additionally or alternatively, the wireless communication module 220 may include a network interface (e.g., a LAN card), a modulator/demodulator (modem), or the like for connecting the hardware 200 to a network (e.g., the Internet, a LAN, a WAN, a telecommunication network, a cellular network, a satellite network, a POTS, or the like).

The RF module 229 may be used for transmission and reception of data, for example, transmission and reception of RF signals or called electronic signals. Although not illustrated, the RF unit 229 may include, for example, a transceiver, a Power Amplifier Module (PAM), a frequency filter, a Low Noise Amplifier (LNA), or the like. Also, the RF module 229 may further include a component for transmitting and receiving electromagnetic waves in a free space in a wireless communication, for example, a conductor, a conductive wire, or the like.

The sensor module 240 may include, for example, at least one of a gesture sensor 240A, a gyro sensor 240B, an barometer sensor 240C, a magnetic sensor 240D, an acceleration sensor 240E, a grip sensor 240F, a proximity sensor 240G, a Red, Green and Blue (RGB) sensor 240H, a biometric sensor 240I, a temperature/humidity sensor 240J, an illumination sensor 240K, and a Ultra Violet (UV) sensor 240M. The sensor module 240 may measure a physical quantity or may sense an operating state of the electronic device 100, and may convert the measured or sensed information to an electrical signal. Additionally/alternatively, the sensor module 240 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein.

The input device 250 may include various input circuitry, such as, for example, and without limitation, a touch panel 252, a pen sensor 254 (e.g., a digital pen sensor), keys 256, and an ultrasonic input unit 258. The input device 250 may be, for example, the user input module 140 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of wireless recognition. According to an embodiment of the present disclosure, the hardware 200 may receive a user input from an external device (e.g., a network, a computer, or a server), which is connected to the communication module 230, through the communication module 230.

The display module 260 may include a panel 262, a hologram 264, or projector 266. The display module 260 may be, for example, the display module 150 illustrated in FIG. 1. The panel 262 may be, for example, a Liquid Crystal Display (LCD) and an Active Matrix Organic Light Emitting Diode (AM-OLED) display, and the like. The panel 262 may be implemented so as to be, for example, flexible, transparent, or wearable. The panel 262 may include the touch panel 252 and one module. The hologram 264 may display a three-dimensional image in the air by using interference of light. According to an embodiment of the present disclosure, the display module 260 may further include a control circuit for controlling the panel 262 or the hologram 264.

The interface 270 may include various interface circuitry, such as, for example, and without limitation, a High-Definition Multimedia Interface (HDMI) 272, a Universal Serial Bus (USB) 274, an optical interface 276, and a D-subminiature (D-sub) 278. Additionally or alternatively, the interface 270 may include, for example, SD/Multi-Media Card (MMC) (not illustrated) or Infrared Data Association (IrDA) (not illustrated).

The audio codec 280 may bidirectionally convert between a voice and an electrical signal. The audio codec 280 may convert voice information, which is input to or output from the audio codec 280, through, for example, a speaker 282, a receiver 284, an earphone 286, the microphone 288 or the like.

The camera module 291 may capture an image and a moving image. According to an embodiment, the camera module 291 may include one or more image sensors (e.g., a front lens or a back lens), an Image Signal Processor (ISP) (not illustrated), and a flash LED (not illustrated).

The power management module 295 may manage power of the hardware 200. Although not illustrated, the power management module 295 may include, for example, a Power Management Integrated Circuit (PMIC), a charger Integrated Circuit (IC), or a battery fuel gauge.

The PMIC may be mounted to, for example, an IC or a SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the hardware 200 or a part (e.g., the AP 211) of the hardware 200, for example, a booting state, a message state, a charging state and the like. The motor 298 may convert an electrical signal into a mechanical vibration. The processor 210 may control the sensor module 240.

Although not illustrated, the hardware 200 may include a processing unit (e.g., a GPU) for supporting a module TV. The processing unit for supporting a module TV may process media data according to standards such as, for example, Digital Multimedia Broadcasting (DMB), Digital Video Broadcasting (DVB), media flow, and the like. Each of the above-described elements of the hardware 200 according to an embodiment of the present disclosure may include one or more components, and the name of the relevant element may change depending on the type of electronic device. The hardware 200 according to an embodiment of the present disclosure may include at least one of the above-described elements. Some of the above-described elements may be omitted from the hardware 200, or the hardware 200 may further include additional elements. Also, some of the elements of the hardware 200 according to an embodiment of the present disclosure may be combined into one entity, which may perform functions identical to those of the relevant elements before the combination.

The term "module" used in the present disclosure may refer to, for example, a unit including one or more combinations of hardware (e.g., circuitry), software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of processing circuitry, an Application-Specific Integrated Circuit (ASIC) chip, a Field-Programmable Gate Array (FPGA), and a programmable-logic device for performing certain operations which have been known or are to be developed in the future.

Figure 3:
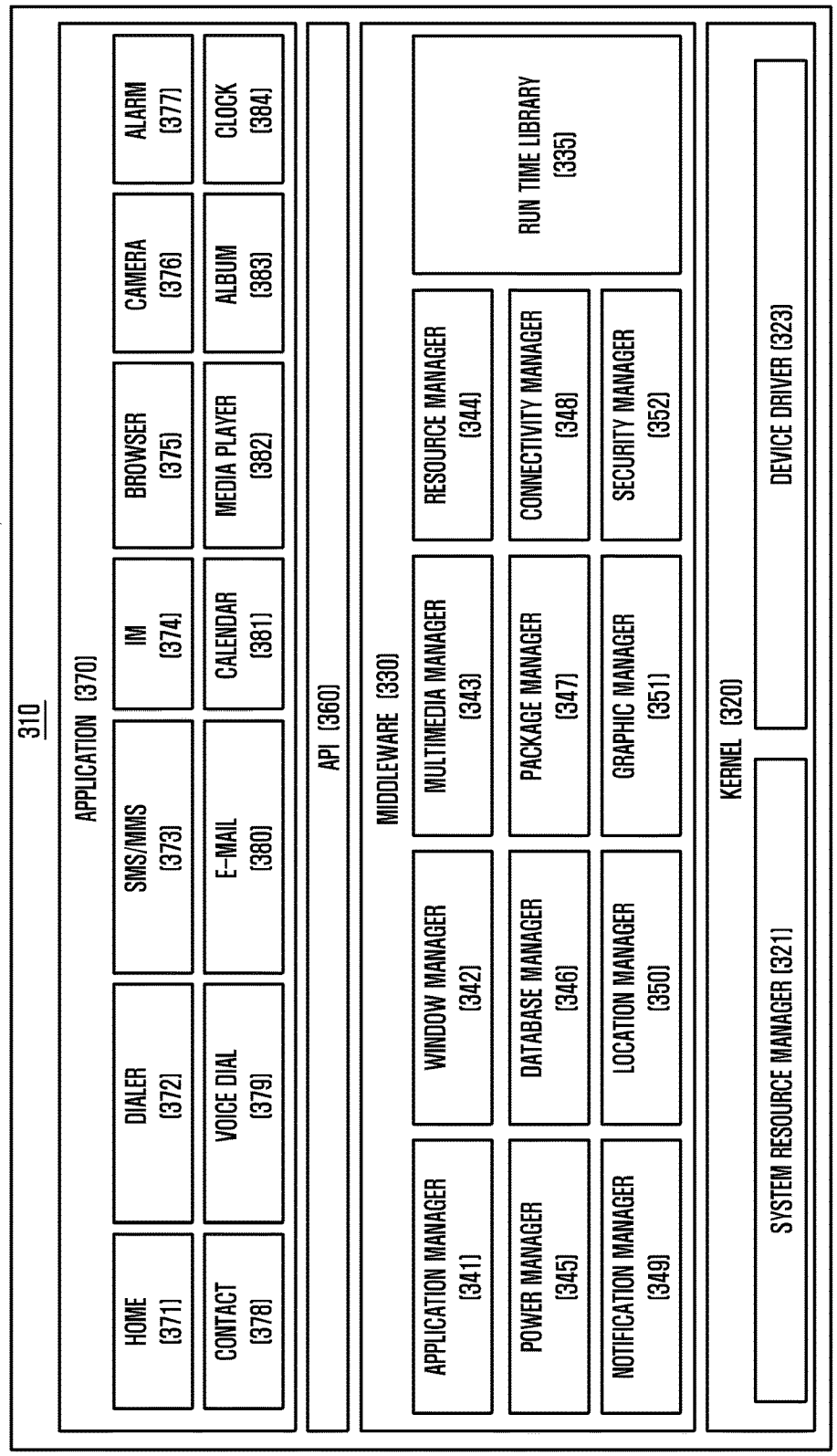
FIG. 3 is a block diagram illustrating an example program module according to various example embodiments of the present disclosure.

FIG. 3 is a block diagram illustrating an example configuration of a programming module 300 according to an example embodiment of the present disclosure.

The programming module 300 may be included (or stored) in the electronic device 100 (e.g., the memory 130) or may be included (or stored) in the electronic device 200 (e.g., the memory 230) illustrated in FIG. 1. At least a part of the programming module 300 may be implemented in software, firmware, hardware, or a combination of two or more thereof. The programming module 300 may be implemented in hardware (e.g., the hardware 200), and may include an OS controlling resources related to an electronic device (e.g., the electronic device 100) and/or various applications (e.g., an application 370) executed in the OS. For example, the OS may be Android, iOS, Windows, Symbian, Tizen, Bada, and the like.

Referring to FIG. 3, the programming module 300 may include a kernel 320, a middleware 330, an API 360, and/or the application 370.

The kernel 320 (e.g., the kernel 141) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 147) may include, for example, a preloaded application and/or a third party application. The applications 370 (e.g., the applications 147) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 220. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Names of the elements of the programming module (e.g., the programming module 300) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

The electronic device according to various embodiments of the present disclosure includes: a communication circuit, a display, and a processor electrically connected between the communication circuit and the display, in which the processor may be configured to confirm one or more access points (APs) outside the electronic device, start a connection to the selected AP of the one or more APs through a communication circuit, acquire AP information corresponding to the selected AP from the selected AP during the connection to the selected AP, determine characteristics of the selected AP based on at least the AP information, and display a first notification in association with the selected AP based on a fact that the characteristics are a first group and a second notification in association with the selected AP based on a fact that the characteristics are a second group through the display. The processor may be set to request a connection to the selected AP based on at least the AP information and receive characteristic information indicating the characteristics as a response to the request from the selected AP. The processor may be set to request the connection using a transmission control protocol (TCP) scheme. The processor may be set to perform a dynamic host configuration protocol (DHCP) process with the selected AP, transmit a DHCP discover message requesting the IP address to the selected AP during the DHCP process, receive a default gateway address associated with the specific AP while receiving a DHCP offer message from the specific AP receiving the DHCP discover message, select a specific IP address from a plurality of IP addresses included in the DHCP offer message, transmit a DHCP request message requesting the selected IP address to the specific AP, and receive a DHCP acknowledge (ACK) message for an allocated IP address from the specific AP receiving the DHCP request message, in which the AP information may include the default gateway address. The first notification may include a first link for directly connecting to a web screen for changing setting of the selected AP and the second notification may include a second link for connecting to the web screen for performing purchase authentication on a use of the selected AP. The first and second links each include a text or icon form and the processor may be set to change at least one of a form, a font, a size, and a color of the text and change at least one of a form and a size of the icon and the number of icons. The processor may classify the selected AP into the first group when changing the setting of the selected AP and classify the selected AP into the second group when the selected AP corresponds to a captive portal AP. The processor may be set to, during the determining of the characteristics of the selected AP, confirm whether a currently selected AP is a mobile hot spot by confirming whether an IP allocated from a DHCP server is in a range used by a specific vendor, confirm whether a currently selected AP is an enterprise AP by confirming WPA Key_mgmt information in a beacon frame where the selected AP is periodically transmitted, confirm whether the currently selected AP is an operator AP by confirming operator profile information pre-stored in a memory upon the release of products, and confirm whether the currently selected AP is the captive portal AP by confirming a redirection. The processor may be set to classify the selected AP into the first group when the selected AP does not correspond to all of the mobile hot spot, the enterprise AP, the operator AP, and the captive portal AP.

Hereinafter, the electronic device according to various embodiments of the present disclosure will be described in more detail.

The electronic device according to various embodiments of the present disclosure may be applied to a WLAN system. The WLAN system includes one or more basic service set (BSS). The BSS is a set of stations (hereinafter, STA) that may be successfully synchronized to communicate with each other. The BSS may be classified into an independent BSS (hereinafter, IBSS) and an infrastructure BSS. In the IBBS, direct communication between the STAs may be made and an operation type between the STAs may be defined as an ad hoc network.

To connect the STA to the BSS, a procedure of synchronizing with a base station needs to be performed. Further, to access all services of the infrastructure BSS, the STA needs to be associated with the base station. The association procedure is dynamically performed may include the use of a distribution system service (DSS). An inter-STA supportable direct distance may be physically limited. The distance may be sufficient in some networks, but if the difference is insufficient, coverage extension may be required. Accordingly, the BSS may be configured as one element in the extended form of the network including the plurality of BSSs. As such, an architecture element used to interconnect the BSSs may be called a distribution system (DS).

The DS is mechanism for connecting a plurality of access points (hereinafter, APs) and is not necessarily a network. Therefore, as long as the DS may provide a predetermined distribution service, a type of the DS is never limited. For example, the DS may also be a wireless network like a mesh network and may also be a physical structure for interconnecting the APs.

In the WLAN system, a distribution system medium (DSM) and a wireless medium (WM) may be logically classified. Each logical medium may be used for different purposes by different elements of the architecture. The DS provides a logical service to manage seamless integration of the plurality of BSSs and address mapping to a destination, thereby supporting mobility of a device.

The AP may be a support apparatus so that the associated STA may access the distribution system through the WM Data may be transmitted between the BSS and the DS through the AP. Here, all the APs may be the STA, and therefore the AP also has entity having an address. However, for communication through the WM and communication through the DSM, the addresses used by the AP need not be the same as each other.

The wireless network having any size and complexity may be formed using the DS and the BSS and the network type may be defined as an extended service set (ESS) network. The ESS may refer, for example, to the plurality of BSSs connected to each other through the DS and may not include the DS. The ESS network has the same logical link control (LLC) layer as the IBSS network, and therefore the STA belonging to the ESS may move from one BSS to another BSS within the same ESS to be transparent to the LLC.

To form physically continuous coverage, the BSSs may partially overlap with each other. Further, a logical distance between the BSSs is not limited, and therefore the BSSs may not be physically connected to each other. Further, to avoid the unnecessary overlapping, the BSSs may not be physically connected to each other. Further, for the case in which the ad hoc network is operated at a position where it has the ESS network, the case in which the WLAN system networks physically overlapping with each other are set to have different structures, or the case in which a plurality of different connections or security policies are required at the same position, one (or more than that) IBBS or the ESS network is one (or more than that) ESS network and may be present in the physically same space.

The STA is logical entity including a physical later interface for a medium access control (MAC) and a wireless medium and may include an AP station (AP STA) and a non-AP station (non-AP STA). Among the STAs, an electronic device manipulated by a user is the non-AP STA, in which the STA may indicate the non-AP STA. The non-AP STA may be called other names such as a smart phone, a terminal, a wireless transmit/receive unit (WTRU), user equipment, a mobile station (MS), a mobile terminal, and a mobile subscriber unit. Further, the AP may be entity that provides an access to the distribution system (DS) through the wireless medium to the station (STA) associated with the corresponding AP. The AP may also be referred to as a centralized controller, a base station (BS), a node-B, a base transceiver system (BTS), a femto BS, a site controller, or the like.

In the WLAN system, an example of a procedure of connecting the electronic device to the AP will be described as follows.

The AP may periodically generate and transmit a broadcast type of beacon frame. The electronic device receiving the beacon frame senses the presence of the access point. The beacon frame may be configured to include a header, a frame body, and a frame check sequence (FCS), and may include information such as a time stamp, a beacon interval, capability, a service set identifier (SSID), and supported rates. The service set identifier is an identifier used to identifier a plurality of different basic service sets in the WLAN system and may also be called a basic service set identifier (BSSID).

The electronic device according to an embodiment of the present disclosure may receive the beacon frames and confirm the presence of the plurality of APs accessible through the received beacon frame. Here, the operation may be defined as passive scanning. The electronic device according to the embodiment of the present disclosure may select a specific AP from the plurality of APs and transmit a probe request frame to the selected AP.

The electronic device according to the embodiment of the present disclosure may store information about the already connected APs as a profile. The electronic device according to the embodiment of the present disclosure may store the information about the already connected APs as the profile, select the AP in a subsequent profile without receiving the beacon frame, and then transmit a probe request frame to the selected access point. Here, the operation may be defined as active scanning.

The probe request frame may be configured to include the header, the frame body, and the frame check sequence (FCS) and may include the information such as the service set identifier (SSID), and the supported rates. The service set identifier is an identifier for identifying the basic service set and any electronic device that does not know a unique service set identifier of a specific basic service set may not access the corresponding basic service set. For example, the electronic device according to the embodiment of the present disclosure may carry the service set identifier on the probe request frame to access the specific basic service set, for example, the AP.

The AP receiving the probe request frame may transmit a probe response frame as a response to the probe request frame to the electronic device. The probe response frame may be configured to include the header, the frame body, and the frame check sequence (FCS), and may include information such as the time stamp, the beacon interval, the capability, the service set identifier (SSID), and the supported rates. A series of processes as described above may be defined as a search process.

The electronic device according to the embodiment of the present disclosure may perform an authentication process with the AP after going through the search process. For example, the electronic device receives the probe response frame from the AP and then may transmit an authentication request frame to the AP to request authentication. The AP transmits the authentication response frame to the electronic device, and thus the AP and the electronic device may establish the authentication relation with each other. The authentication request frame and/or the authentication response frame may be configured to include the header, the frame body, and the frame check sequence (FCS) and may include information such as an authentication algorithm number, an authentication transaction sequence number, and a status code.

The electronic device according to the embodiment of the present disclosure may perform an association process with the AP after going through the authentication process. For example, after the AP and the electronic device establish the authentication relation with each other and then the electronic device may transmit the association request frame to the AP. The association request frame may be configured to include the header, the frame body, and the frame check sequence (FCS) and may include the information such as the capability, a listen interval, the service set identifier (SSID), and the supported rates.

The AP according to the embodiment of the present disclosure transmits the association response frame as a response to the association request frame to the electronic device, and thus may be connected to the electronic device. The association request frame may be configured to include the header, the frame body, and the frame check sequence (FCS) and may include the information such as the capability, the status cod, an association ID (AID), and the supported rates. The association identifier (AID) may refer, for example, to a specific identifier allocated to each electronic device for the AP to differentiate the plurality of electronic devices after the electronic device is associated with the AP.

Figure 4:
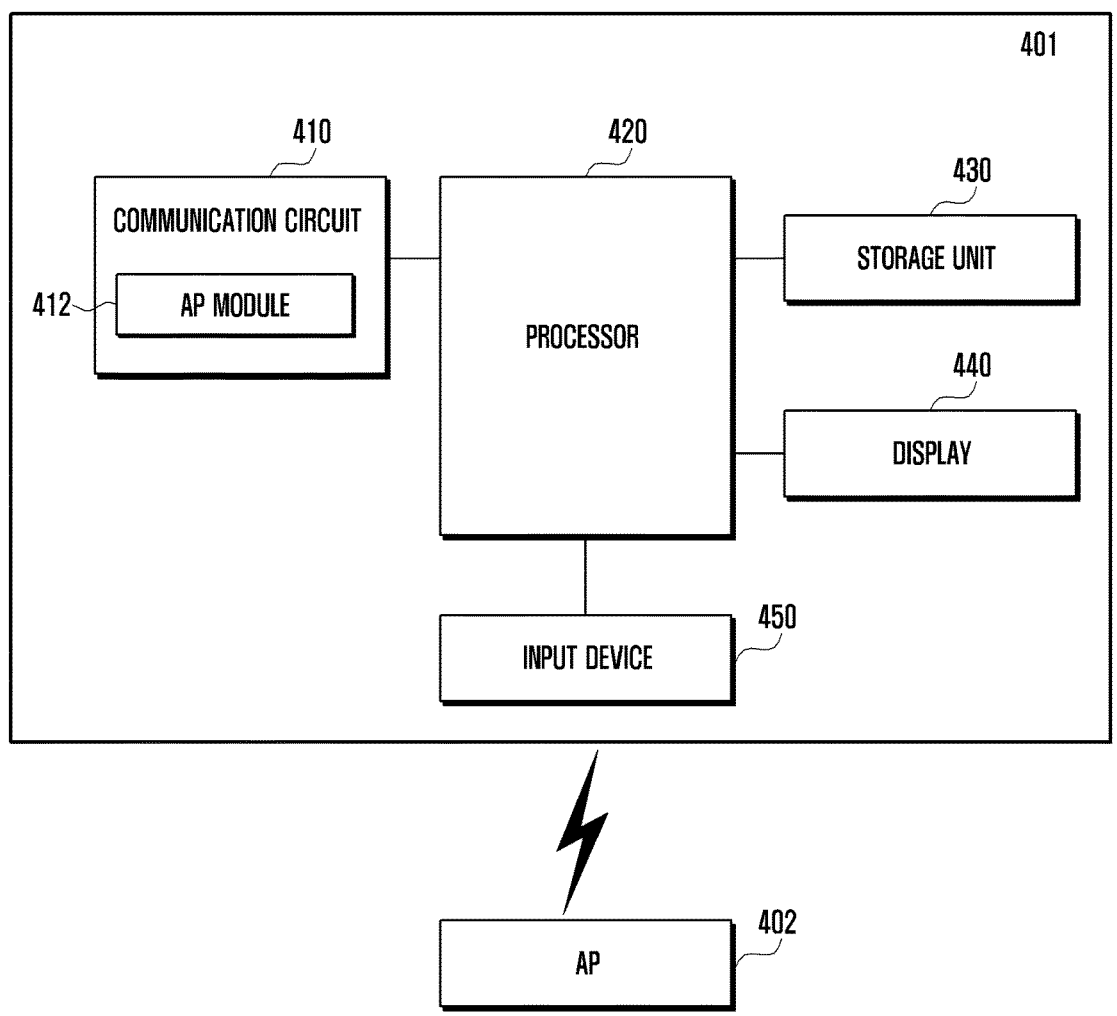
FIG. 4 is a block diagram illustrating an example electronic device according to various example embodiments of the present disclosure.

FIG. 4 is a block diagram illustrating an example electronic device according to various embodiments of the present disclosure.

Referring to FIG. 4, the electronic device 401 according to various embodiments of the present disclosure may include a communication circuit 410, a processor 420, a storage unit 430, a display 440, and an input device (e.g., including input circuitry) 450.

The communication circuit 410 (for example: communication module 220) may include various communication circuitry, such as, for example, and without limitation, at least one component for wireless communication between an electronic device 401 and a wireless communication system or wireless communication between the electronic device 401 and another electronic device (for example: electronic device 102). For example, the communication circuit 410 may include communication circuitry for an access point module (AP module) 412 for wireless communication between the electronic device 401 and the WLAN system. The electronic device may use the AP module 412 to be connected to an AP 402 through the WLAN system.

The processor 420 (for example: processor 210) controls a general operation of the electronic device 401 and a signal flow between internal blocks of the electronic device 401 and may perform a data processing function of processing data. For example, the processor 420 may be a central processing unit (CPU), a microprocessor unit (MPU), an application processor, or the like.

When a connection with the specific AP 402 is completed in the WLAN system, the processor 420 according to the embodiment of the present disclosure may be set to provide at least one notification for setting the connected AP 402 to a user. For this purpose, the processor 420 may acquire setting information about the corresponding AP 402 during the connection process with the specific AP 402 and provide the notification for setting the AP 402 to a user when the connection with the specific AP 402 is completed. Further, the processor 420 may access a server configured in the AP 402 based on a user input for the notification and request access authority authentication for the server to the user. When the access authority is authorized, the processor 420 may provide a detailed screen for setting the AP 402 to the user.

The processor 420 may acquire AP setting information for setting the AP 402 from the corresponding AP 402 during the connection process with the specific AP 402. The AP setting information may include a default gateway address for accessing the server configured in the AP 402. The processor 420 may acquire the default gateway address during the connection process with the corresponding AP 402, for example, acquire the default gateway address during the DHCP process of acquiring the IP address from the AP 402.

The processor 420 may provide notification for setting the AP 402 based on the AP setting information, for example, the default gateway. The notification may include a text or icon form set to be linked with an initial web screen for setting the AP 402. The notification according to the embodiment of the present disclosure may be provided in a form changing at least one of a form, a font, a size, and a color of the text. Further, the notification according to the embodiment of the present disclosure may be provided in a form changing at least one of a form and a size of the icon and the number of icons.

The link operation to the initial web screen may be performed by an access to a port of a server configured in the AP 402 according to information about the received default gateway. The notification may be displayed at one side of a name of the currently connected AP 402 on the screen displaying names of the currently searched APs 402 in a list form. Further, the notification may be provided on the screen that displays a connection function of a display to the AP 402, for example, a shortcut icon turning on/off a WLAN connection function. When the shortcut icon is displayed, the notification may be displayed at an adjacent position to the shortcut icon.

The processor 420 may receive the user input for the notification through the input device to provide the initial web screen for setting the currently connected AP 402. The processor 420 may access the port of the server configured in the AP 420 by referring to the default gateway address value. The processor 420 may transmit a setting request message to the server and receive a permit message from the server to provide interfaces for setting the AP 402 to a user. The processor 420 may request the authority authentication, which can access the function of setting the AP 402, to a user prior to providing the screen for setting the AP 402 to the user. For example, the processor 420 may display the initial web screen and then request the access authority authentication for the function of setting the AP 402 to the user. The processor 420 may allow a user to provide access authority authentication information input through the input device to the server and may provide the detailed setting screen for setting the AP 402 to the user when getting the access authority authentication from the server. The processor 420 may communicate with the server configured in the AP 402 using HTTP protocol to provide the initial web screen for setting the AP and the detailed setting screen for setting the AP 402 as described above.

The storage unit 430 (for example: memory 230) may store user data and data transmitted and received upon communication as well as application programs required for other option functions, for example, a sound playing function, an image or moving picture playing function, a broadcast playing function, or the like, in addition to an operating system (OS) of the electronic device 401. The storage unit 430 may store an ID, a password, or the like for authenticating the access authority for the screen for setting the AP 402. Therefore, when receiving the request of the access authority authentication for the AP setting screen from the server of the AP 402, the processor 420 may refer to the ID and password stored in the storage unit 430 to automatically perform the authentication. Further, the storage unit 430 may substitute the pre-stored ID and password into the changed ID and password under the control of the processor 420 when the user changes the ID and password.

The display 440 (for example: display 260) may display the information input by the user or the information provided to the user in addition to various menus of the electronic device 401. The display 440 may communicate with the server of the AP 402 using the HTTP protocol to provide the initial web screen for setting the AP and the detailed setting screen for setting the AP 402 based on the acquired HTML document, under the control of the processor 420. The display 430 may be formed as a liquid crystal display (LCD), an organic light emitted diode (OLED), an active matrix organic light emitted diode (AMOLED), or the like. When the display 430 is formed in a touch-screen form, the display 430 may be operated as the input device 450.

The input device 450 (for example; input device 250) may include various input circuitry that receives numerals or various character information and may include an input key and a functional key for setting various functions and controlling the function of the electronic device 401. The input device 450 according to the embodiment of the present disclosure may receive the notification for setting the currently connected AP 402, for example, the user input for the text or the icon linked to the initial web screen for setting the AP and provide the received notification and user input to the processor 420. The input device 450 may be any one of input means such as a button type keypad, a ball joystick, an optical joystick, a wheel key, a touch key, a touch pad, and a touch screen or a combination thereof.

A method of providing information about an access point (AP) according to various embodiments of the present disclosure may include an operation of confirming one or more access points (APs) outside an electronic device, an operation of starting a connection to the selected AP of the one or more APs through a communication circuit, an operation of acquiring AP information corresponding to the selected AP from the selected AP during the connection to the selected AP, an operation of determining characteristics of the selected AP based on at least the AP information, and an operation of displaying a first notification in association with the selected AP based on a fact that the characteristics are a first group and a second notification in association with the selected AP based on a fact that the characteristics are a second group through the display. The method may further include an operation of requesting a connection to the selected AP based on at least the AP information and an operation of receiving characteristic information indicating the characteristics as a response to the request from the selected AP. The operation of connecting to the selected AP may include the operation of requesting a connection using a transmission control protocol (TCP) scheme. The method further includes a dynamic host configuration protocol (DHCP) operation with the selected AP, in which the DHCP operation may include an operation of transmitting a DHCP discover message requesting the IP address to the selected AP during the DHCP process, an operation of receiving a default gateway address associated with the specific AP while receiving a DHCP offer message from the specific AP receiving the DHCP discover message, an operation of selecting a specific IP address from a plurality of IP addresses included in the DHCP offer message, an operation of transmitting a DHCP request message requesting the selected IP address to the specific AP, and an operation of receiving a DHCP acknowledge (ACK) message for an allocated IP address from the specific AP receiving the DHCP request message and the AP information may include the default gateway address. The first notification may include a first link for directly connecting to a web screen for changing setting of the selected AP and the second notification may include a second link for connecting to the web screen for performing purchase authentication on a use of the selected AP. The first and second links each include a text or icon form and the method may further include an operation of changing at least one of a form, a font, a size, and a color of the text and an operation of changing at least one of a form and a size of the icon and the number of icons. The method may further include an operation of classifying the selected AP into the first group when the setting of the selected AP may be changed and an operation of classifying the selected AP into the second group when the selected AP corresponds to a captive portal AP. The operation of determining the characteristics of the selected AP may include an operation of confirming whether the currently selected AP is a mobile hot spot by confirming whether an IP allocated from a DHCP server is in a range used by a specific vendor, an operation of confirming whether a currently selected AP is an enterprise AP by confirming WPA Key_mgmt information in a beacon frame where the selected AP is periodically transmitted, an operation of confirming whether the currently selected AP is an operator AP by confirming operator profile information pre-stored in a memory upon the release of products, and an operation of confirming whether the currently selected AP is the captive portal AP by confirming a redirection. The method may further include an operation of classifying the selected AP into the first group when the selected AP does not correspond to all of the mobile hot spot, the enterprise AP, the operator AP, and the captive portal AP.

Hereinafter, a method for connecting and setting an electronic device according to various embodiments of the present disclosure to and in a specific AP will be described with reference to FIGS. 5 to 12.

Figure 5:
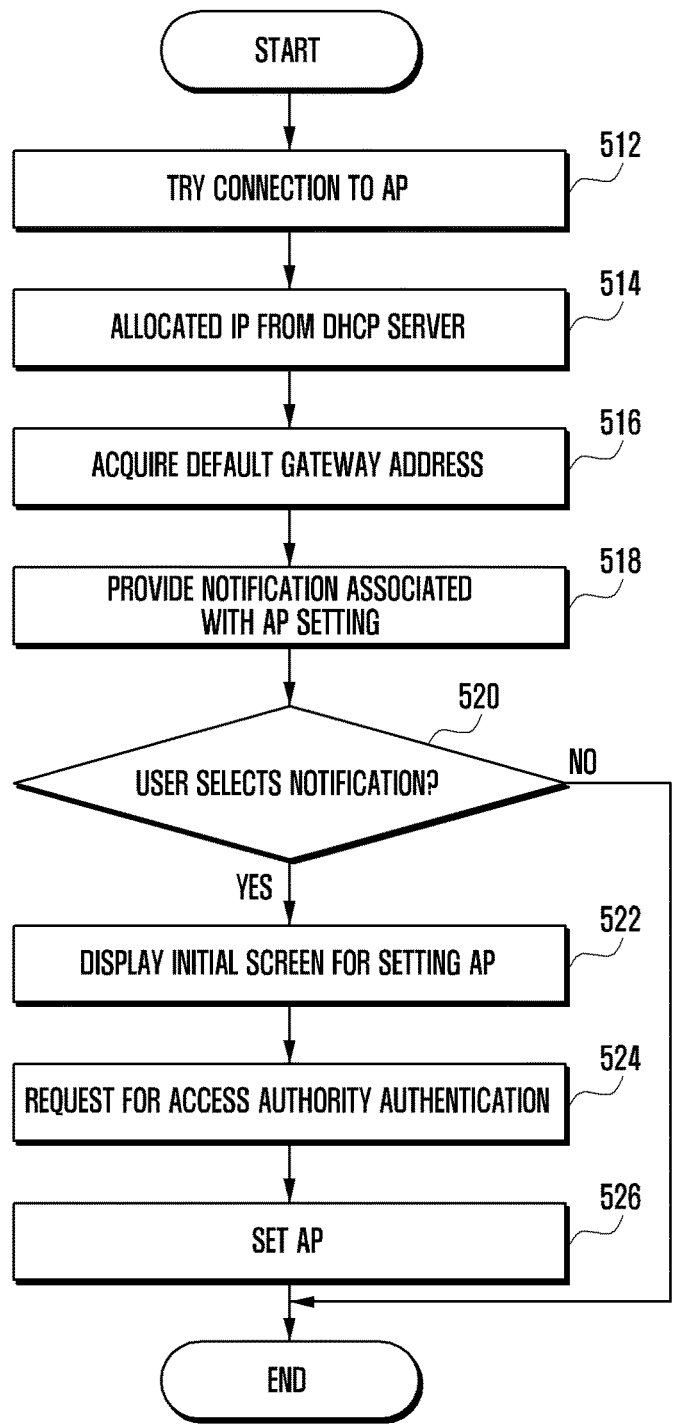
FIG. 5 is a flowchart illustrating an example method of connecting and setting an electronic device to and in an specific AP according to various example embodiments of the present disclosure.
Figure 6:
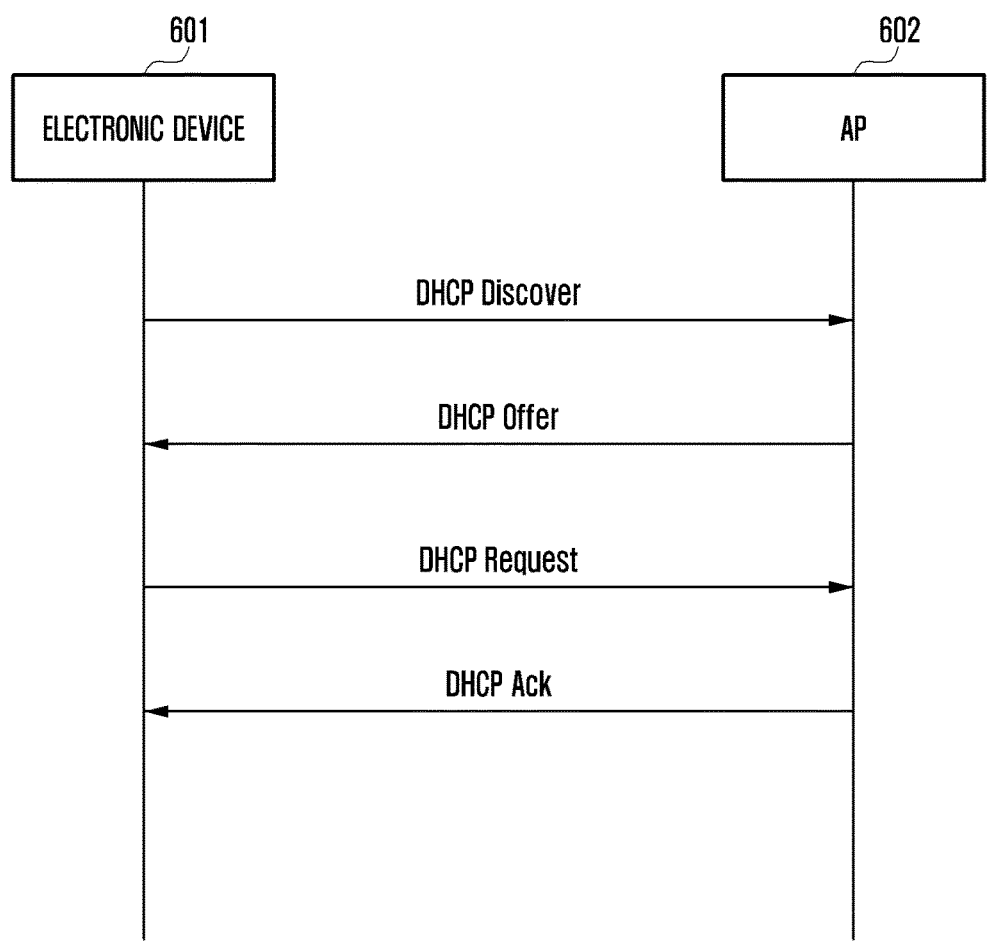
FIG. 6 is a diagram illustrating an example DHCP process performed by the electronic device together with the specific AP according to various example embodiments of the present disclosure.
Figure 7:
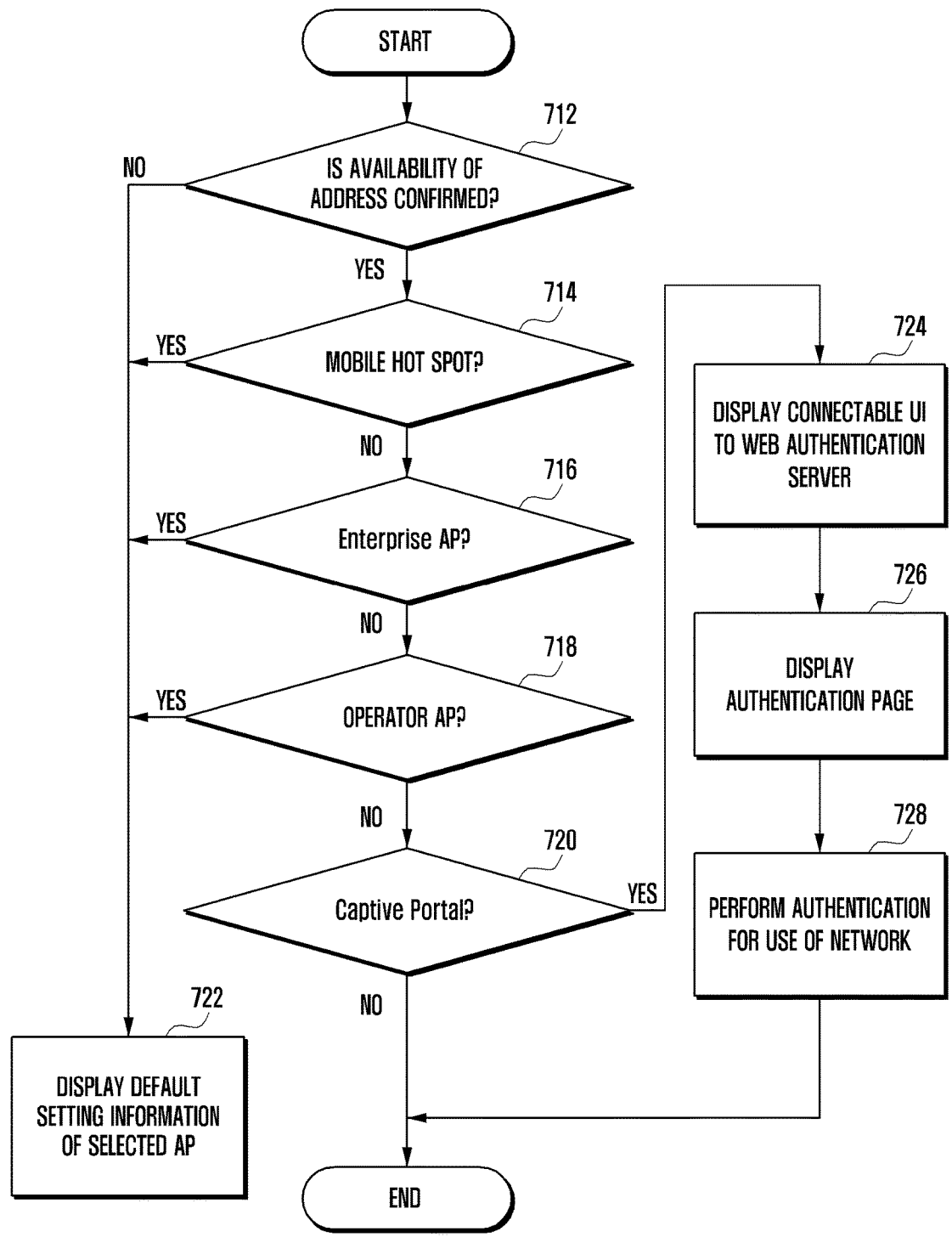
FIG. 7 is a flowchart illustrating an example method of connecting and setting an electronic device to and in a specific AP according to various example embodiments of the present disclosure.
Figure 9:
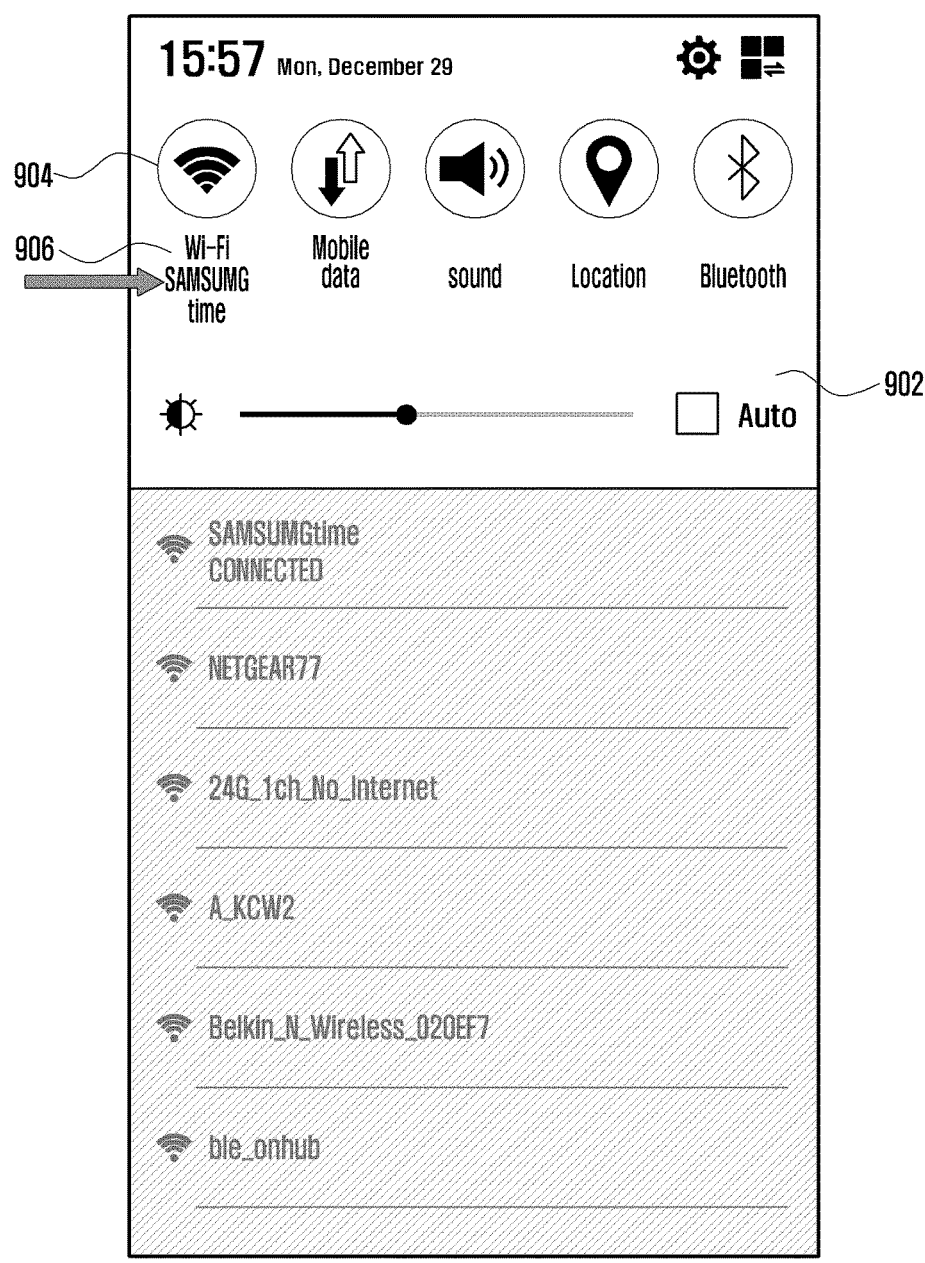
FIG. 9 is a diagram illustrating an example of providing, by the electronic device, notification associated with AP setting information according to various example embodiments of the present disclosure.
Figure 10:
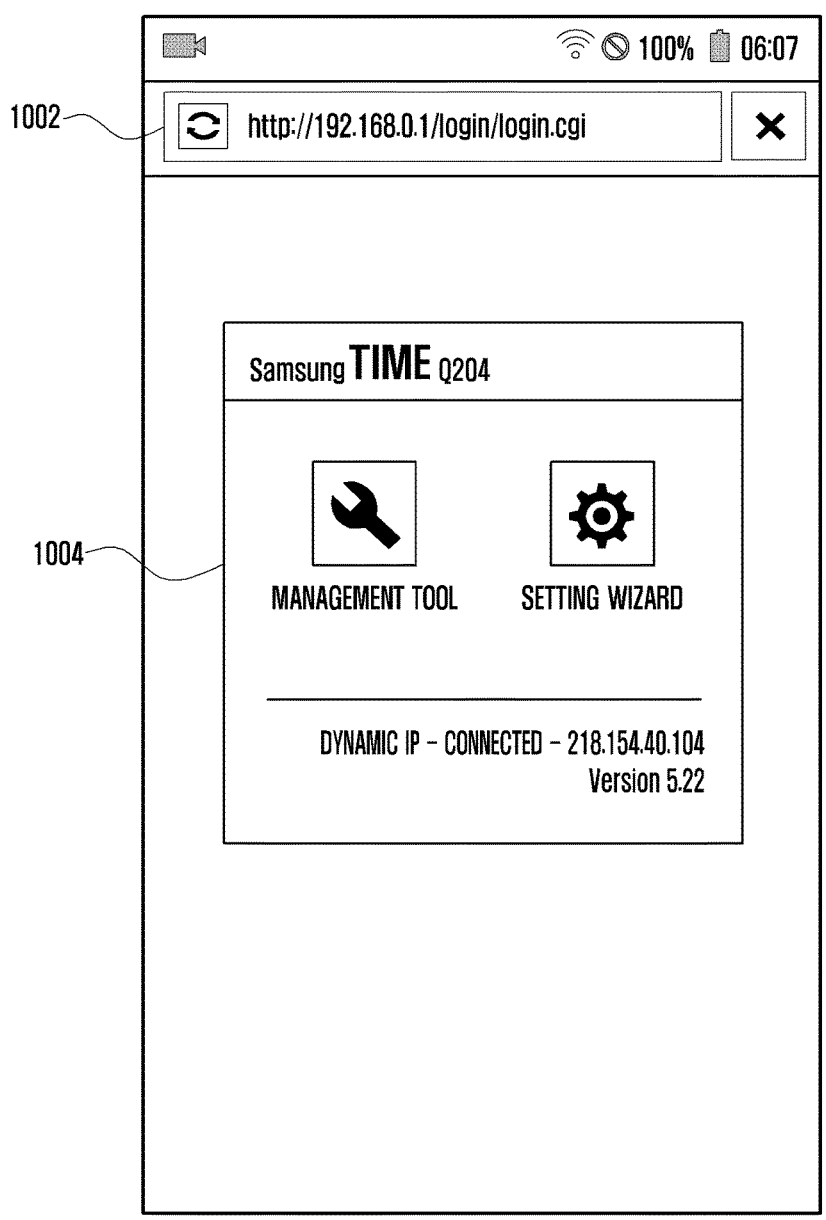
FIG. 10 is a diagram illustrating an example of providing, by the electronic device, an initial web screen for setting the specific AP according to various example embodiments of the present disclosure.
Figure 11:
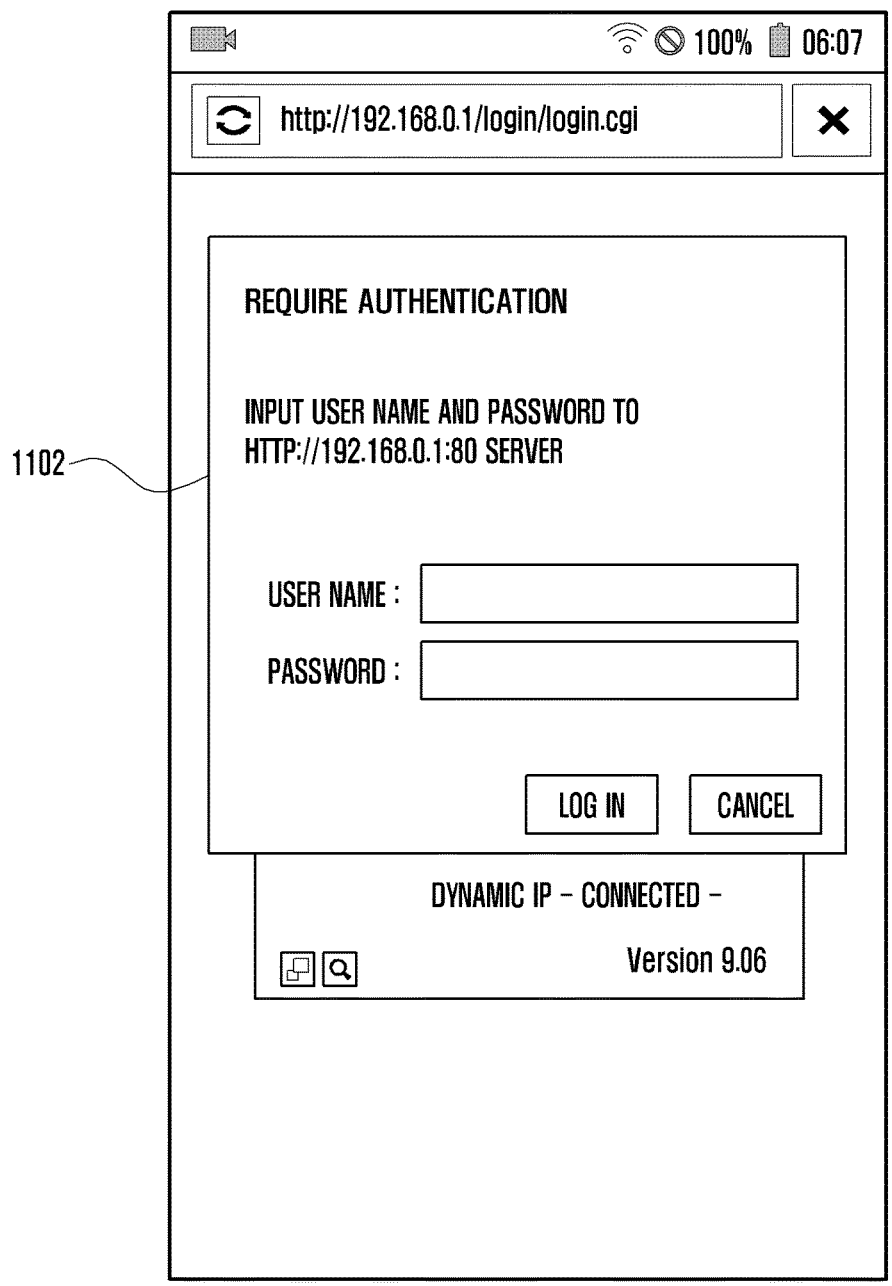
FIG. 11 is a diagram illustrating an example of providing, by the electronic device, an access authority authentication screen to a function for setting the specific AP according to various example embodiments of the present disclosure.

FIG. 5 is a flowchart illustrating an example method of connecting and setting an electronic device according to various example embodiments of the present disclosure to and in a specific AP. FIG. 6 is a diagram illustrating an example of a DHCP process performed by the electronic device according to various example embodiments of the present disclosure together with the specific AP. FIG. 7 is a flowchart illustrating an example method of connecting and setting an electronic device according to various example embodiments of the present disclosure to and in a specific AP. FIGS. 8A and 8B are diagrams illustrating an example of providing, by the electronic device according to various example embodiments of the present disclosure, notification associated with AP setting information. FIG. 9 is a diagram illustrating an example of providing, by the electronic device according to various example embodiments of the present disclosure, notification associated with AP setting information. FIG. 10 is a diagram illustrating an example of providing, by the electronic device according to various example embodiments of the present disclosure, an initial web screen for setting the specific AP. FIG. 11 is a diagram illustrating an example of providing, by the electronic device according to various example embodiments of the present disclosure, an access authority authentication screen to a function for setting the specific AP. FIG. 12 is a diagram illustrating an example of providing, by the electronic device according to various example embodiments of the present disclosure, a detailed setting screen for setting the specific AP.

Referring to FIG. 5, the method of connecting and setting an electronic device according to various embodiments of the present disclosure to and in a specific AP may include an operation (512) of trying to connect a processor to an AP, an operation (514) of allocating an IP to the processor from a server configured in the AP during a DHCP process, an operation (516) of acquiring, by the processor, a default gateway address from the server during the DHCP process, an operation (518) of providing notification associated with the setting of the AP based on the default gateway address acquired by the processor, an operation (520) of determining a user input for the notification an operation (522) of displaying an initial screen for setting the AP based on the user input for the notification, an operation 524 of receiving, by the processor, a request of access authority authentication for the screen for setting the AP from the server of the AP 402 to request the authority authentication to a user, and an operation (526) of providing a setting function for the AP to the authorized user.

In the operations 512, 514, and 516, the processor 420 may start the connection to the specific AP through the communication circuit based on the user input. For example, the processor 420 may be allocated the IP from the AP by performing the DHCP process. Further, the processor 420 may acquire the AP setting information, for example, the default gateway address of the AP. In detail, referring to FIG. 6, the processor 420 of the electronic device 601 according to the embodiment of the present disclosure may transmit a DHCP discover message requesting an IP address to an AP 602. The processor 420 of the electronic device 601 may transmit the DHCP discover message in a broadcast type since it does not know the IP address of the electronic device 601 and the IP of the AP 602 that is the DHCP server. The AP 602 receiving the DHCP discover message may transmit a DHCP offer message to the electronic device 601 as a response thereto. The DHCP offer message may include information such an IP address allocated from the AP 602, a subnet mask, a period, and a DHCP address. The AP 602 may transmit the DHCP offer message in the broadcast type. The processor 420 may select a specific IP address among the IP addresses included in the DHCP offer message and transmit a DHCP request message to request the selected IP address to the AP 602. The AP 602 may transmit a DHCP acknowledge (Ack) message to complete the allocation of the IP address to the electronic device 601. The DHCP discover message may be a message transmitted to first allocate an IP address to the electronic device 601. Therefore, after the electronic device 601 is allocated the IP address and then the IP address expires, the transmission of the DHCP discover message may be omitted. When the processor 420 again requests the IP address to the AP 602, the processor 420 transmits the DHCP request message to the AP 602 and thus may be allocated the IP address.

In particular, the processor 420 according to the embodiment of the present disclosure may receive the AP setting information during the DHCP process. For example, the processor 420 may receive the AP setting information (for example: default gateway address) in the operation of receiving the DHCP offer message.

In the operation 518, if the processor 420 is allocated the IP when the connection to the AP is completed, the processor 420 may provide the notification for setting the AP 402 based on the AP setting information, for example, the default gateway. The notification may include a text or icon form set to be linked an initial web screen for setting the AP 402. The notification according to the embodiment of the present disclosure may be provided in a form changing at least one of a form, a font, a size, and a color of the text. Further, the notification according to the embodiment of the present disclosure may be provided in a form changing at least one of a form and a size of the icon and the number of icons.

As illustrated in FIG. 8A, the notification 802 may be displayed at one side of a name of the currently connected AP 402 on the screen displaying names of the currently searched APs 402 in a list form. As illustrated in FIG. 8B, the processor 420 may provide the detailed information screen 804 associated with the current AP when selecting a region, in which the name of the currently connected AP is displayed, from the list. The processor 420 may provide the notification 802 in an icon form and a notification 806 in a text form on the detailed information screen.

As illustrated in FIG. 9, the processor 420 according to the embodiment of the present disclosure may provide the notification on the screen that displays a connection function of a display to the AP 402, for example, a shortcut icon turning on/off a WLAN connection function. For example, the processor 420 may display a shortcut icon window 902 one side of the screen on which the display is displayed, for example, an upper side of the screen. The shortcut icon window 902 may be provided with a plurality of shortcut icons for rapidly setting various functions provided from the electronic device 401, for example, may be provided with a shortcut icon 904 turning on/off the WLAN connection function. As such, when the shortcut icon window 902 is displayed, the processor 420 may provide a notification 906 to a position adjacent to the shortcut icon 904 turning on/off the WLAN connection function. The notification 906 may be the text form or the icon form.

In the operation 520, the processor 420 may determine whether the user input for the notification is generated. The processor 420 may recognize a user selection for the notification by sensing a simple touch input depending on the user input for the notification. Further, the processor 420 may recognize the user selection for the notification depending on the user input for the notification that is sustained over a specific time. For example, the processor 420 may determine whether the user input for the notification is generated through the input device and compare the sustained time of the user input with a reference time when the user input is generated. When the sustained time of the user input exceeds the reference time, the processor 420 may recognize that the user selects the notification to perform a control to display the initial web screen on the display.

In the operation 522, the processor 420 may display the initial web screen for setting the AP based on the user input for the notification. For example, as illustrated in FIG. 10, the processor 420 may input the default gateway address to a next address window 1002 executing a browser when the user input for the notification is generated to display an initial web screen 1004 for providing the AP setting function. The processor 420 may display the initial web screen 1004 based on HTML document information received through the port of the server configured in the AP and corresponding to the default gateway address. For example, if the processor 420 is allocated the IP when the connection with the specific AP is completed, the processor 420 may transmit the setting request message for accessing the setting function of the AP to the server of the AP. The processor 420 may receive a permit message from the server of the AP receiving the setting request message, receive the HTML document information for displaying the initial web screen, and display the initial web screen based on the HTML document information.

In the operation 524, the processor 420 may request the access authority authentication for the function of setting the AP to a user. For example, as illustrated in FIG. 11, the processor 420 may provide an authentication request screen 1102 to a user when the user tries the AP setting in the initial web screen state. The access authority for the function of setting the AP may be provided to the user, having a unique ID and password set during the process of producing the AP at an early stage. The user may input the unique ID and password set for the AP through the input device to perform the authority authentication. When the storage unit 430 pre-stores the unique ID and password, the processor 420 may automatically perform the access authority authentication for the function of setting the AP. Therefore, when the ID and the password are pre-stored, the processor 420 may not provide the screen requesting the access authority authentication for the function of setting the AP.

In the operation 526, the processor 420 may provide the AP setting screen to the authorized user. For example, the processor 420 may transmit the received ID and password to the server of the AP through the input device. As illustrated in FIG. 12, when receiving the access authority authentication message from the server, the processor 420 may provide the detailed setting screen for setting the AP to the user. The processor 420 may receive the authentication message and receive the HTML document information for displaying the detailed setting screen.

Referring to FIG. 7, the method of connecting and setting an electronic device according to various embodiments of the present disclosure to and in a specific AP may include an operation (712) of confirming availability of an IP address allocated from a server, an operation (714) of determining whether a currently connected AP is a mobile hot spot, an operation (716) of determining whether the currently connected AP is an enterprise AP, an operation (718) of determining whether the currently connected AP is an operator AP, an operation (720) of determining whether the currently connected AP is a captive portal AP, and an operation 722 of displaying only basic information of the currently connected AP as a default. Further, the method of connecting and setting an electronic device according to various embodiments of the present disclosure to and in a specific AP may further include an operation (724) of providing a notification or a user interface connectable to a web authentication server when the currently connected AP is the captive portal AP, an operation (726) of providing an authentication page for authenticating a use of a network through the captive portal AP, and an operation (728) of performing authentication based on a user input for the notification or the user interface.

In the operation 712, the processor 420 may confirm the availability of the IP address allocated from the AP. In detail, the IP address allocated from the AP may not be effective when an error of the DHCP or an equipment error of the AP occurs. Therefore, the processor 420 may confirm the allocated IP address to previously determine when the Internet connection and the transmission and reception of packet through the AP may not be made. For example, the processor 420 may try a transmission control protocol (TCP) connection to the allocated IT address. The TCP connection may include a TCP 3 way handshaking process. When the TCP connection succeeds, the processor 420 may determine whether the corresponding IP address is effective and when the TCP connection fails, the processor 420 may determine whether the corresponding IP address is not effective.

In the operations 714, 716, and 718, the processor 420 may determine whether the currently connected AP belongs to a first group that may change the setting or a second group that may not change the setting. The first processor 420 may display the notification on the display when the connected AP belongs to the first group and display only the basic information about the AP other than the notification when the connected AP belongs to the second group. The APs that belong to the first group is an opening AP that has been widely used and may be a personal WLAN router. The APs belonging to the second group may not be set, and may include, for example, the mobile hot spot, the enterprise AP, and the operator AP. Therefore, the processor 420 may display only the basic information on the corresponding AP when the currently connected AP is any one of the mobile hot spot, the enterprise AP, and the operator AP. For example, in the operation 714, the processor 420 may confirm whether the currently connected AP is the mobile hot spot by confirming whether the IP allocated from the DHCP server is in a range used by a specific vendor. Further, in the operation 716, the processor 420 may confirm whether the currently connected AP is the enterprise AP by confirming WPA Key_mgmt information in a beacon frame where the AP is periodically transmitted.

In the operation 718, the processor 420 may confirm whether the currently selected AP is the operator AP by confirming operator profile information pre-stored in a memory upon the release of products. Further, in the operation 720, the processor 420 may confirm whether the currently selected AP is the captive portal AP by confirming a redirection As such, the method may further include the operation (724) of providing a notification or a user interface connectable to a web authentication server when the currently connected AP is the captive portal AP, the operation (726) of providing an authentication page for authenticating a use of a network through the captive portal AP, and the operation (728) of performing authentication based on a user input for the notification or the user interface.

As the 802.11i WPA standard as a security technology of the 802.11 network is diffused, the captive portal AP has been used. This is a technology of implementing a user authentication and billing system of a wireless network as the communication standard. The captive portal AP is not for wireless LAN security authentication for enterprise but is for provision of low level security to unspecified users. Therefore, the captive portal AP may mainly be used for places such as a hotel and an airport in and out which people come and go and may be a service providing a wireless LAN service to people paying a fee. If the electronic device according to the embodiment of the present disclosure is connected to the AP to which the captive portal is applied, the connection of the WLAN level based on the 802.11 open system authentication may be completed. After the electronic device is connected to the captive portal AP, when a user first tries to open any web page, the electronic device intercepts the corresponding HTTP GET message on a network and may redirect the intercepted message to an authentication server page of the wireless network. The electronic device may provide an Internet service to a user through the captive portal AP only after transmitting the authentication information required by the authentication server.

When the electronic device according to the embodiment of the present disclosure is connected to the captive portal AP, the electronic device permits the Internet connection service only for a specific time of the user authentication, for example, 12 hours, 24 hours, and 1 week and may provide a scheme of inducing repurchasing of re-authentication or authentication information after the specific time ends. Accordingly, the electronic device according to the embodiment of the present disclosure may provide the notification or the user interface that may directly access the purchase authentication page to the user when the currently connected AP is the captive portal AP. The notification or the user interface for the authentication page of the captive portal AP may include the text or icon form. The notification or the user interface may be provided in a form changing at least one of a form, a font, a size, and a color of the text. Further, the notification or the user interface according to the embodiment of the present disclosure may be provided in a form changing at least one of a form and a size of the icon and the number of icons.

In the operation 722, when the IP address allocated from the currently connected AP is not effective or the currently connected AP is the second group, for example, any one of the mobile hot spot, the enterprise AP, and the operation AP, the processor 420 may display only the basic setting information of the corresponding AP and may not display the notification for changing the setting of the AP.

The processor 420 according to the embodiment of the present disclosure may classify even the captive portal AP into the second group, in addition to the mobile hot spot, the enterprise AP, and the operator AP. Therefore, even when the currently connected AP is the captive portal AP, the processor 420 may provide only the basic setting information that the corresponding AP is the captive portal AP.

As described above, it is possible to improve the user convenience by easily accessing the screen for security setting of the AP and prevent the security issue by easily changing the security setting of the AP.

A programming module according to embodiments of the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the disclosure has been illustrated and described with reference to certain embodiments thereof, it will be understood by those skilled in the art that various changes in form and detail may be made therein without departing from the spirit and scope of the disclosure as defined by the appended claims.

What is claimed is:

1. An electronic device, comprising:
   a communication circuit;
   a display; and
   a processor electrically connected between the communication circuit and the display, wherein the processor is configured to:
   detect one or more access points (APs) outside the electronic device,
   connect to an AP selected by a user, from among the one or more APs outside the electronic device, through the communication circuit,
   acquire AP information corresponding to the selected AP from the selected AP during the connection to the selected AP,
   determine characteristics of the selected AP based on at least the AP information, and
   based on the characteristic of the selected AP being a first group, display a first notification in association with the selected AP, or based on the characteristic of the selected AP being a second group, display a second notification in association with the selected AP,
   wherein the characteristics of the selected AP include whether the selected AP is able to change setting,
   wherein the processor is further configured to:
   based on the selected AP being able to change setting, classify the selected AP into the first group, and
   based on the selected AP corresponding to a captive portal AP, classify the selected AP into the second group.

2. The electronic device of claim 1, wherein the processor is configured to request a connection to the selected AP based on at least the AP information and to receive characteristic information indicating the characteristics in response to the request from the selected AP.

3. The electronic device of claim 2, wherein the processor is configured to request the connection using a transmission control protocol (TCP) scheme.

4. The electronic device of claim 1, wherein the processor is configured to:
   perform a dynamic host configuration protocol (DHCP) process with the selected AP and transmit a DHCP discover message requesting the IP address to the selected AP during the DHCP process, receive a default gateway address associated with the specific AP while receiving a DHCP offer message from the specific AP receiving the DHCP discover message, select a specific IP address from a plurality of IP addresses included in the DHCP offer message and transmit a DHCP request message requesting the selected IP address to the specific AP, and receive a DHCP acknowledge (ACK) message for an allocated IP address from the specific AP receiving the DHCP request message, wherein the AP information includes the default gateway address.

5. The electronic device of claim 1, wherein the first notification includes a first link for connecting to a web screen for changing setting of the selected AP, and the second notification includes a second link for connecting to the web screen for performing purchase authentication on a use of the selected AP.

6. The electronic device of claim 5, wherein the first and second links each include a text and/or icon, and the processor is configured to change at least one of a form, a font, a size, and a color of the text and change at least one of a form and a size of the icon and the number of icons.

7. The electronic device of claim 1, wherein the processor is configured to, during the determining of the characteristics of the selected AP:

determine whether a currently selected AP is a mobile hot spot by confirming whether an IP allocated from a DHCP server is in a range used by a specific vendor, determine whether the currently selected AP is an enterprise AP by confirming WPA Key mgmt information in a beacon frame where the selected AP is periodically transmitted, determine whether the currently selected AP is an operator AP by confirming operator profile information pre-stored in a memory, and determine whether the currently selected AP is the captive portal AP by confirming a redirection.

8. The electronic device of claim 7, wherein the processor is configured to classify the selected AP into the first group when the selected AP does not correspond to the mobile hot spot, the enterprise AP, the operator AP, and the captive portal AP.

9. A method of providing, by an electronic device, information about an access point (AP), comprising:

detecting one or more access points (APs) outside an electronic device;

connecting to an AP selected by a user, from among the one or more APs outside the electronic device, through a communication circuit;

acquiring AP information corresponding to the selected AP from the selected AP during the connection to the selected AP;

determining characteristics of the selected AP based on at least the AP information; and based on the characteristic of the selected AP being a first group, displaying a first notification in association with the selected AP, or based on the characteristic of the selected AP being a second group, displaying a second notification in association with the selected AP, wherein the characteristics of the selected AP include whether the selected AP is able to change setting, wherein determining characteristics of the selected AP further comprises:

based on the selected AP being able to change setting, classifying the selected AP into the first group; and based on the selected AP corresponding to a captive portal AP, classifying the selected AP into the second group.

10. The method of claim 9, further comprising:

requesting a connection to the selected AP based on at least the AP information; and receiving characteristic information indicating the characteristics as a response to the request from the selected AP.

11. The apparatus of claim 9, wherein connecting to the selected AP includes requesting a connection using a transmission control protocol (TCP) scheme.

12. The method of claim 9, further comprising:

a DHCP operation with the selected AP, wherein the DHCP operation includes:

transmitting a DHCP discover message requesting the IP address to the selected AP during the DHCP process;

receiving a default gateway address associated with the specific AP while receiving a DHCP offer message from the specific AP receiving the DHCP discover message;

selecting a specific IP address from a plurality of IP addresses included in the DHCP offer message, and transmitting a DHCP request message requesting the selected IP address to the specific AP; and receiving a DHCP acknowledge (ACK) message for an allocated IP address from the specific AP receiving the DHCP request message, wherein the AP information includes the default gateway address.

13. The method of claim 9, wherein the first notification includes a first link for connecting to a web screen for changing setting of the selected AP, and the second notification includes a second link for connecting to the web screen for performing purchase authentication on a use of the selected AP.

14. The method of claim 13, further comprising:

changing at least one of a form, a font, a size, and a color of a text; and changing at least one of a form and a size of an icon and the number of icons, wherein the first and second links each include the text and/or icon form.

15. The method of claim 9, wherein the operation of determining the characteristics of the selected AP includes:

determining whether a currently selected AP is a mobile hot spot by confirming whether an IP allocated from a DHCP server is in a range used by a specific vendor;

determining whether the currently selected AP is an enterprise AP by confirming WPA Key mgmt information in a beacon frame where the selected AP is periodically transmitted;

determining whether the currently selected AP is an operator AP by confirming operator profile information pre-stored in a memory; and determining whether the currently selected AP is the captive portal AP by confirming a redirection.

16. The method of claim 15, further comprising:

classifying the selected AP into the first group when the selected AP does not correspond to the mobile hot spot, the enterprise AP, the operator AP, and the captive portal AP.

17. A non-transitory computer-readable medium having stored thereon instructions that, when executed by at least one processor of an electronic device, cause the electronic device to perform a method, the method comprising:

detecting one or more access points (APs) outside an electronic device;

connecting an AP selected by a user from among the one or more APs through a communication circuit;

acquiring AP information corresponding to the selected AP from the selected AP during the connection to the selected AP;

determining characteristics of the selected AP based on at least the AP information; and based on the characteristic of the selected AP being a first group, displaying a first notification in association with the selected AP, or based on the characteristic of the selected AP being a second group, displaying a second notification in association with the selected AP, wherein the characteristics of the selected AP include whether the selected AP is able to change setting, wherein determining characteristics of the selected AP further comprises:
  based on the selected AP being able to change setting, classifying the selected AP into the first group; and
  based on the selected AP corresponding to a captive portal AP, classifying the selected AP into the second group.

\* \* \* \* \*